United States Patent [19]
Norbeck

[11] 3,751,940
[45] Aug. 14, 1973

[54] REFRIGERATION SYSTEM PRV MOTOR CONTROL SYSTEM

[75] Inventor: Dean K. Norbeck, York, Pa.
[73] Assignee: Borg-Warner Corporation, Chicago, Ill.
[22] Filed: Sept. 17, 1971
[21] Appl. No.: 181,407

[52] U.S. Cl. .................. 62/217, 62/230, 318/599
[51] Int. Cl. .............................................. F25b 1/00
[58] Field of Search ................ 62/217, 230; 317/38; 318/609, 599; 323/24

[56] References Cited
UNITED STATES PATENTS

| | | | |
|---|---|---|---|
| 3,652,912 | 3/1972 | Bordonaro | 318/599 |
| 3,639,824 | 1/1972 | Malavasi | 318/599 |
| 3,633,073 | 1/1972 | Day et al. | 317/38 |
| 3,436,629 | 4/1969 | Adler | 318/599 |
| 3,260,912 | 7/1966 | Gregory | 318/599 |

Primary Examiner—John J. Camby
Assistant Examiner—Paul Devinsky
Attorney—Donald W. Banner et al.

[57] ABSTRACT

An improved system for automatically energizing from a.c. mains the PRV motor of a refrigeration system over an extensive range of average (long time constant) rates in response to a control signal is disclosed employing a sawtooth wave generator of a frequency two orders of magnitude below the a.c. mains frequency, a d.c. control signal source, a comparator to compare the control signal and the sawtooth signals and produce a d.c. output pulse at the sawtooth frequency of greater or lesser width (0° to 360°) depending on their relationship. A transistor switch is driven from the comparator to operate a Triac for the pulse period and energize from the a.c. mains the windings of the motor. Two comparators are arranged to alternatively produce pulses depending on whether the control signal is above (e.g. +1 to 13v) or below (e.g. −1 to −13v) a desired "deadband" (+1 to −1). One comparator's output energizes "open" motor winding while the others output energizes "close" winding.

4 Claims, 2 Drawing Figures

REFRIGERATION SYSTEM PRV MOTOR CONTROL SYSTEM

FIELD OF THE INVENTION

The present invention relates to refrigeration systems and their control and is especially concerned with the type of such a system employing refrigerant throttling (such as pre-rotation vanes) as a cooling capacity control.

CROSS REFERENCE

The present invention may be employed in a refrigeration system and control such as that disclosed in copending U.S. Pat. application Ser. No. 181,507, entitled "Temperature Control System for Centrifugal Liquid Chilling Machine" filed on Nov. 17, 1971 (the same filing date as the present invention) in the name of the present inventor Dean K. Norbeck and Francis A. Kimpel, and assigned to the same assignee, Borg-Warner Corporation, as the present invention.

Reference should also be had to the copending U.S. Pat. application 882,792, entitled "Overload and Overcurrent Regulation and Protection System," filed on Dec. 5, 1969 and now issued, on Jan. 4, 1972, as U.S. Pat. No. 3,633,073. in the names of Arthur R. Day and Francis A. Kimpel and also assigned to the same assignee as the present invention.

BACKGROUND OF THE INVENTION

The general background of this art is set out in the aforementioned applications. The present invention is concerned with the control and operation of refrigerant throttling means such as pre-rotation vanes (PRV) in a compressor. PRV's are opened to increase cooling capacity or closed to decrease capacity conventionally by means of an electric motor usually geared down so as to move the vanes at a slow rate. (For example, the a.c. vane motor turning at 60 hz may require one minute or more to drive the vanes over their full range of positions.) Despite this slow rate, problems of "overshoot" and "hunting" still occur in the system especially as the system approaches equilibrium.

SUMMARY OF THE INVENTION

The present invention has devised a novel system for energizing the throttling (PRV) motor in response to a control signal so as to reduce or eliminate these problems. Such a system, constructed in accordance with the present invention, comprises at least a sawtooth wave generator having a slow frequency output and a comparator having as one input the output of the generator and its other input a control voltage signal. The comparator functions to produce a series of pulses whose width is proportional to the control signal. These pulses are used to control switch means to energize the motor during their duration.

The invention, together with the further advantages thereof, may best be understood by reference to the following description taken in connection with the accompanying drawings, in the several figures of which like reference numerals identify like elements, and in which:

GENERAL DESCRIPTION

Figure 1:
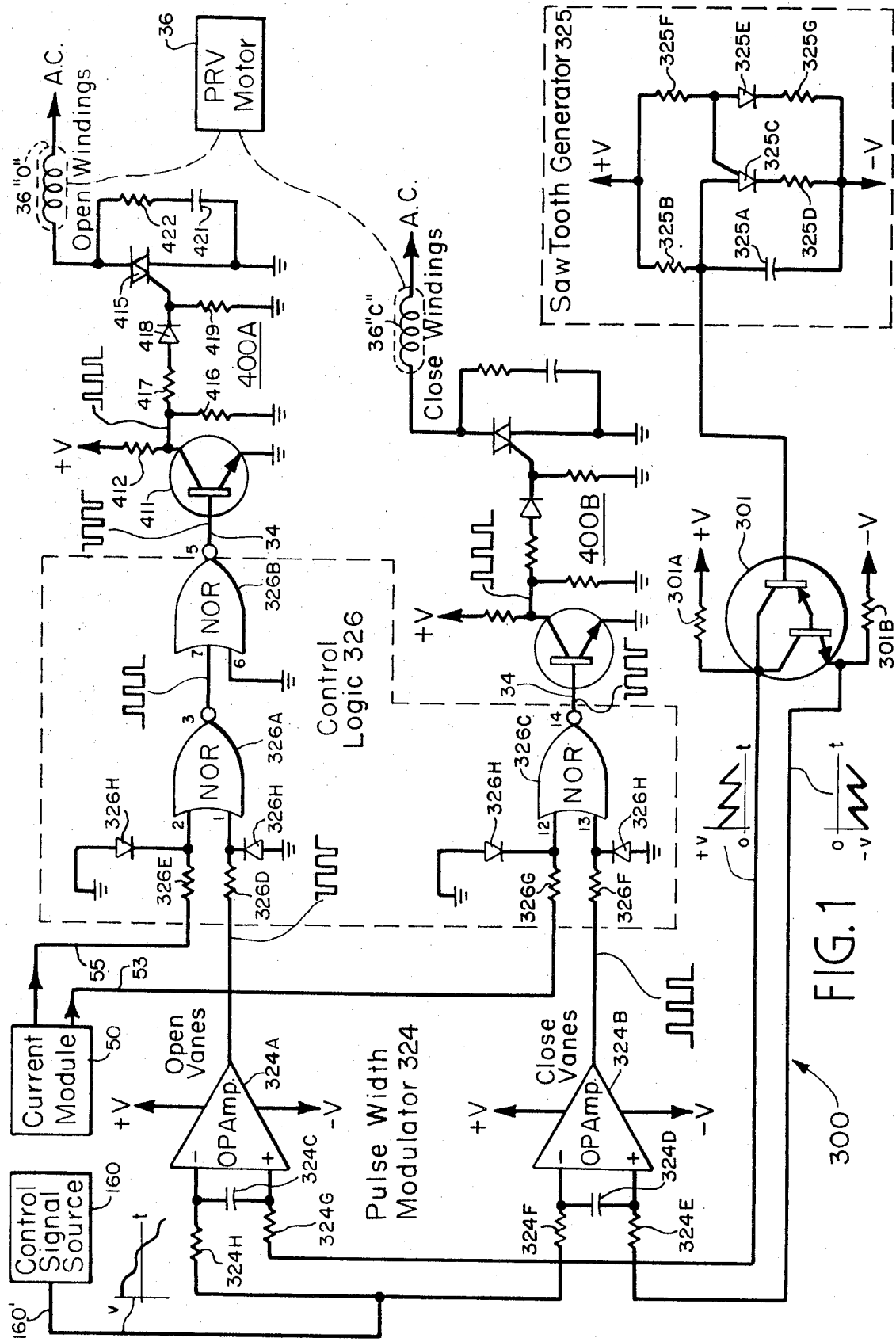
FIG. 1 is a circuit diagram of a system constructed in accordance with the present invention and FIG. 2 is a series of waveforms of voltage versus time for various points of the circuit diagram of FIG. 1 which waveforms are useful in explaining and illustrating the operation thereof.

In FIG. 1 hereof the control voltage from source 160 on line 160' may, as illustrated, vary with time about a reference level corresponding to the normal or desired sensed condition. Variations above and below this level indicate a higher and lower, respectively, chilled liquid temperature than desired.

The source 160 may be that disclosed in the above mentioned copending coincidentally filed application of which the present inventor is a co-inventor or may be any equivalent source. The present system is used in a refrigeration system (not here detailed or shown) such as that described in the aforementioned applications. The present invention is generally depicted in the above mentioned application of the present inventions, whose FIG. 1 and 5 and the description thereof is hereby incorporated by reference.

According to the present invention the system, generally 300 in FIG. 1, includes a pulse width modulator 324 which includes a sawtooth wave generator 325 and a pair of comparators 324A, 324B whose outputs are coupled through logic, generally 326, to respectively a "open" and "close" switching circuit 400A and 400B which are coupled to energize respectively the open and closed windings 36"O" and 36"C" of the vane motor 36.

Figure 2:
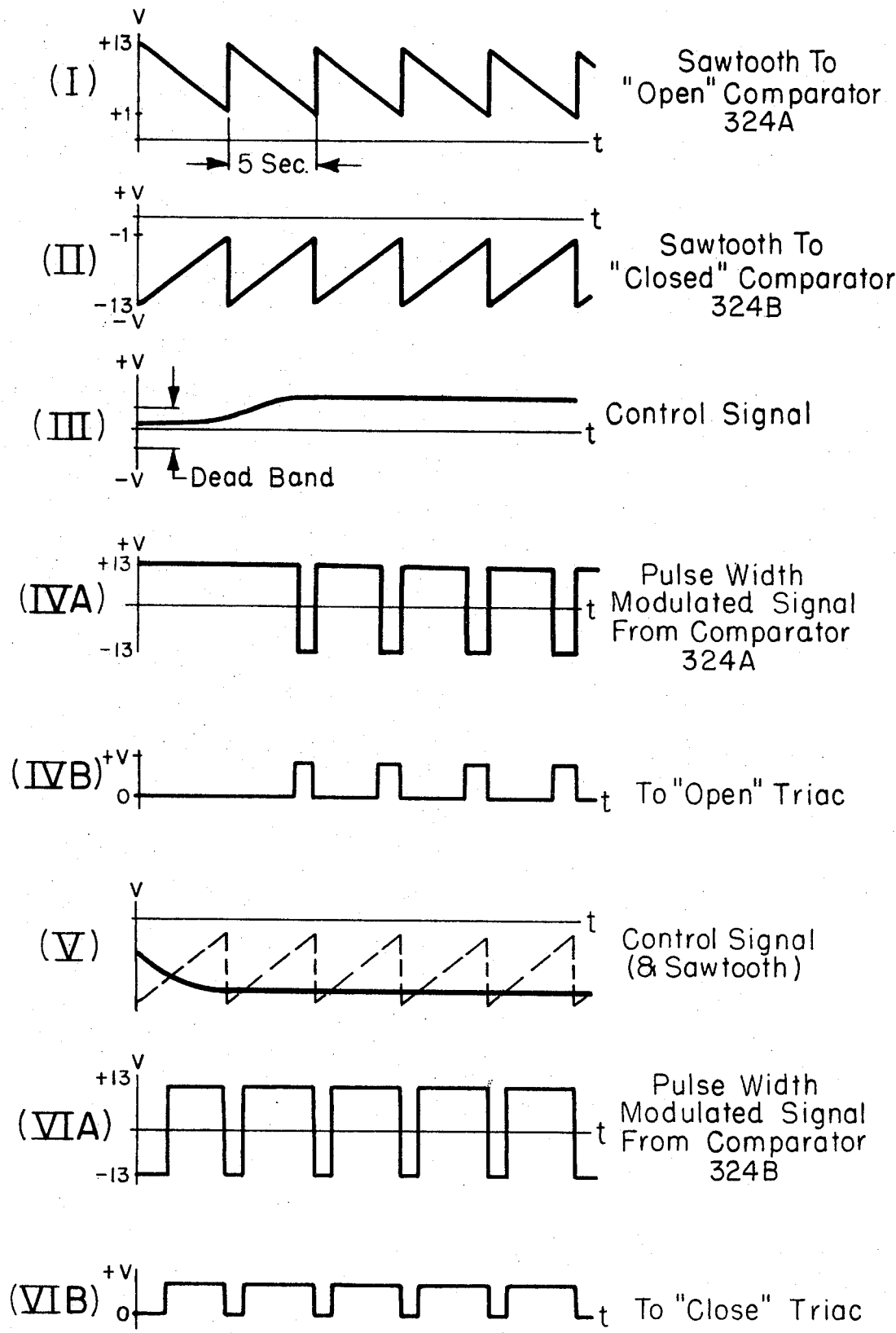

The general operation of this circuit can be understood by referring to FIG. 2. Graph I and II represent sawtooth waveforms applied from the generator 325 to respectively the positive inputs of the comparators. The frequency of these waveforms is the same and is small compared to the a.c. mains by two orders of magnitude (e.g., 0.2 hz versus 60 hz). Note that these waveforms start at a low value (e.g., +1, −1v), respectively, above and below the reference level (0v) and to a high value (e.g., +13v, −13v). The intermediate range (+1 to −1v) is a "deadband."

Graph III represents an example of the input signal on line 160'. When this voltage deviates out of the "deadband" the output of one but not both of the comparators 324A and 324B changes to produce a pulse train such as shown in Graph IVA for the "open" comparator 324A. This output is (after passing through the logic circuitry 326 and control circuitry 400A) modified somewhat as shown in FIG. IVB and coupled to the control electrod of the Triac 415. The corresponding switch 400A, in this case, operates to energize the appropriate winding (open winding 36"O" in our example). The average energization over a long period of the motor 36 depends on the width of other pulses which width may vary from 0° (no voltage) to 360° (continuous d.c. signal).

The result of a control signal excursion in the opposite direction beyond the deadband, is illustrated (solid line) in FIG. 2, Graph V. The sawtooth of Graph II (in dashed lines) is superimposed on the control signal in Graph V. In this case a realtively large drop in required capacity and the resulting wide pulses from comparator 324B (fed to the "closed" channel this time) are illustrated in Graph VIA. Somewhat modified pulses, Graph VIB, derived from the signal of Graph VIA, are fed to the control electrod of the Triac of circuit 400B.

DETAILED DESCRIPTION

In FIG. 1 the signal on line 160' is fed through a resistor 324H to the negative input of the operational amplifier (Op Amp) which forms the comparator 324A and also through a resistor 324F to the negative input of the Op Amp which forms the comparator 324B.

A positive going sawtooth waveform (Graph 1, FIG. 2) is fed to the positive input of the Op Amp 324A through a similar resistor 324G. An inverted, mirror image, negative going waveform (Graph II, FIG. 2) is similarly fed to the positive input of Op Amp 324B. In the case of each Op Amp a capacitor, 324C and 324D respectively, are connected across the primary inputs.

The sawtooth waveforms are derived from the collector and emitter of a Darlington Pair transistor 301 whose base input is taken from the generator 325. Biasing resistors 301A and 301B are respectively connected between sources of positive and negative bias +V, −V and the collector and emitter of the Darlington transistor 300.

The sawtooth wave generator 325 comprises a programable unijunction transistor 325C whose cathode is connected through a resistor 325D to negative bias −V. The anode of transistor 325C serves as the output to the control of transistor 301 and is also connected through resistor 325B to V+ and through capacitor 325A to V−. The control electrode of transistor 325C is connected to the anode of a diode 325E, which anode is also connected through a resistor 325F to V+, and whose cathode is connected through a resistor 325 G to V−.

The sawtooth generator 325 is similar to that shown in "Transistor Manual," Seventh Edition, General Electric Company, 1964, P. 313. It is desirable to use a programable unijunction transistor in this circuit so that the deadband width may be controlled.

The pulse width modulator 324 includes the sawtooth generator 325 whose output feeds the phase splitting circuit of the Darlington pair transistor 300. This circuit provides two sawtooth signals 180° out of phase with each other. One signal starts at a high value, e.g., +13 volts and goes in a decreasing ramp to a low value, e.g. +1 volt. The other signal starts at a negative value, e.g. −13 volts and goes in an increasing ramp to a low negative value, e.g. −1 volt. These two signals are fed into two high gain operational amplifiers 324A, 324B which act as comparators and level detectors. If the signal on line 160' is low and indicating a small open correction is needed the output of the (open) high gain amplifier 324A will stay off until the ramp from the phase splitter equals the line 160' signal. At that point the high gain amplifier 324A output switches, generating a pulse which lasts until the sawtooth returns sharply to, for example, +13 volts.

This pulse eventually feeds the open winding 36"O" of the vane motor. If the control signal on line 160' were greater indicating a larger correction is needed, the pulse generated by the high gain amplifier 324A would be longer in duration. Thus the output of the high gain amplifier is modulated by the control signal. If the control signal is zero no pulses will occur since the sawtooth ramp only goes down to +1 volts or up to −1 volts. This creates the deadband for the control.

The converse of the akove description holds for a negative output on the Summing Amplifier and the other sawtooth output and high gain amplifier 324B which feed the close winding 36"C" of the vane motor.

The Control Logic unit 326 combines signals from the pulse width modulator 324 and current limit signal to control the pre-rotation vanes. These gates are used in standard logic circuits to provide outputs, which through transistor switching circuits, control Triacs connected in the open and closed winding circuits of the motor 34.

Although here, for circuit purposes, the comparators 324A and 324B have the signal from line 160' fed into their negative inputs and use an inverted sawtooth waveform on their positive inputs, those skilled in this art will readily recognize that the same result could be obtained in other ways. For example, by feeding the signal on line 160' to opposite (+ and −) inputs and the single sawtooth waveform to the other input (− and +) of the comparators 324A and 324B. However, since the logical "NOR" function is desired with the override signals on line 53 and 55 (see the above mentioned Day and Kimpel application) and presently commercially available and economically priced logic circuit units are available with several of such NOR gates, two of these gates 326A and 326B are instead employed to invert the signal from Op Amp 324A in the present arrangement. Although from a pure logic diagram analysis this may appear needlessly complex, it is, for electric circuit gain considerations, the presently preferred mode of accomplishing the desired end.

The NOR gate 326A, 326B and 326C are employed to the output from Op Amp 324A being fed through a resistor 326D to the one input of NOR 326A whose other input is fed from line 55 through a resistor 326E. Similarly, the output of Op Amp 324B and line 53 are fed through respective resistors 326F and 326G to the inputs of NOR 326C. Each of the four inputs of NORS 326A and 326C has the cathode of one of four diodes 326H (whose anode is grounded) connected to it.

The output of NOR 326A is one input of the third NOR 326B whose other input is ground to achieve an inversion of its signal output. The outputs from the logic 326 are fed to identical circuits 400A and 400B connected to respectively the "open" and "closed" windings 36"O" and 36"C". As such, only circuit 400A will be described. This circuit includes a NPN transistor 411 whose base is connected to the logic output, whose emitter is grounded and whose collector is connected through a resistor 412 to +V. The transistor 411 serves as a switch and either shunts or does not shunt current from the control electrode of a Triac 415 connected in series with the winding 36"O" and the a.c. mains. The collector of transistor 411 is connected through a resistance 416 to ground and through a resistor 417 to the anode of a diode 418 whose cathode is connected to the control of Triac 415 and through a resistor 419 to ground.

As is conventional the Triac 415 has a series connected capacitor 421 and resistor 422 connected across its power circuit.

For completeness in the disclosure of the above described system but not for purposes of limitation the following representative values and component identifications are submitted. These values and components were employed in a system that was constructed and tested and which provided high quality performance. Those skilled in this art will recognize that many alternative elements and values may be employed in constructing systems and circuits in accordance with the present invention. Indeed, even though the herein set out system and circuit are the presently considered best mode of practicing the invention, the present inventors may themselves decide, after further experiments and experience of for differing environments of use, to make modifications and changes from the herein set out values.

| Components | Type or Value |
|---|---|
| Operational Amplifiers 324A and 324B | MC1741G |
| Darlington Transistor 400 | 2N5308 |
| NOR Gates 326A, 326B and 326C | MC724P (four gates in one package three used) |
| Transistors 411 | 2N5172 |
| Programable Unijunction Transistor 325C | 2N6028 |
| Triacs 415 | RCA 40532 |
| Diodes 412, 325E and 324H | 1N914 |
| Capacitor 325A | 5 micro f. |
| Capacitor 421 | 0.33 micro f. |
| Capacitors 324C and 324D | 0.01 micro f. |
| Resistor 325B | 1.8 Meg. ohms |
| Resistors 324H, 324G, 324F and 324E | 100K ohms |
| Resistor 325F | 24.9K ohms |
| Resistor 325G | 20.5K ohms |
| Resistor 325D | 2.0K Ohms |
| Resistors 326E, 326D, 326G and 326F | 9.1K Ohms |
| Resistors 401A and 401B | 2.0K ohms |
| Resistor 416 | 15.6K ohms |
| Resistor 419 | 10K ohms |
| Resistor 412 | 820 ohms |
| Resistor 417 | 620 ohms |
| Resistor 422 | 100 ohms |

While efforts have been made to accurately record and transcribe the above set out values it is of course, possible that one or more errors may have inadvertently crept into this compilation. To guard against these, the reader is cautioned to employ the well-known methods to mathematically and experimentally verify the above.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. In a refrigeration system of the type whose cooling capacity, is, at least in part, governed by the setting of throttling means, the improvement, comprising:
   means for producing an electrical control signal that varies one of its characteristics from a norm to indicate thereby a desired change in cooling capacity of the refrigeration system;
   means coupled to receive the control signal and responsive thereto to produce a d.c. pulse train output of essentially one frequency but varying pulse width as a function of the variation in characteristics of the control system;
   an electric motor coupled to said pulse producing means and to the throttling means for adjusting the setting of the throttling means, said motor having windings that are energized in response to the pulse train output of said pulse producing means, and wherein
   a source of override signals is provided;
   logic means are coupled to said pulse producing means and to said override signals for preventing adjustment of the setting of the throttling means in response to the control signal in response to the override signals.

2. The improvement in temperature regulator control system for refrigeration equipment of the type having a capacity control analog signal source, and having its capacity governed by an a.c. electric motor which motor is of the type that can be operated from a source of fixed frequency a.c. power in either clockwise or counterclockwise direction, comprising in combination:
   first and second means for producing pulses of essentially one frequency but of variable width, said first and second means respectively producing pulses whenever the capacity control signal exceeds a first pre-set value or is below a second pre-set value, said first and second means then producing pulses whose width is a function of the difference between the control signal value and their respective pre-set values, the pulses when produced by said first and second means being at a frequency which is small compared to the fixed frequency of the a.c. power;
   said first and second pre-set values differing from each other so as to establish a deadband wherein the control signal may vary without resulting in pulses being produced by either said first or second means;
   means responsive to the pulses of first means for coupling the a.c. power to the a.c. electric motor so as to cause it to rotate in the clockwise direction for the duration of the first means pulses; and
   means responsive to the second means for coupling the a.c. power to the a.c. electric motor so as to cause it to rotate in the counterclockwise direction for the duration of the second means pulses.

3. The invention of claim 2 wherein:
   the frequency of pulses when produced by said first and second means is two orders of magnitude below the fixed frequency of the a.c. power source;
   said analog signal source produces a d.c. level signal whose amplitude variation from a norm level is indicative of the desired change in cooling;
   said first means for producing a pulse train includes a sawtooth waveform generator for producing a sawtooth output of the small frequency and a first comparator coupled thereto and to receive the control signal, said first comparator producing pulses whenever the amplitudes of the control signal and the sawtooth signal reach and exceed a certain relationship.

4. The invention of claim 3 wherein:
   said analog signal direction of change, above and below the norm, is indicative of the desired direction of change of decrease and increase of the system cooling capacity; and
   said second pulse producing means includes a second comparator coupled to said sawtooth generator and to receive said control signal, said second comparator producing pulses whenever the amplitude of the control signal and its received sawtooth signal reach and exceed a different certain relationship.

* * * * *